Nov. 21, 1933.

L. O. GRAVES

Re. 19,006

TOOTHBRUSH

Original Filed Nov. 30, 1928

INVENTOR
Lynus O. Graves.
BY
Harness Dickey Pierce & Hann
ATTORNEYS.

Reissued Nov. 21, 1933

Re. 19,006

UNITED STATES PATENT OFFICE 19,006

TOOTHBRUSH

Lynus O. Graves, Fraser, Colo.

Original No. 1,753,290, dated April 8, 1930, Serial No. 322,658, November 30, 1928. Application for reissue October 7, 1931. Serial No. 567,508

11 Claims. (Cl. 15—135)

This invention relates to a tooth brush and has for its principal object the provision of an inexpensive, easily manufactured brush which will contain the tooth paste.

It is primarily intended for a single use, it containing sufficient paste for one application after which the brush may be discarded. It is not necessarily, however, limited to this, since provision is made for inserting additional tooth paste.

Another object of the invention is to provide a tooth paste container which can be fitted into the back of a tooth brush so as to discharge into the brush bristles.

A further object of the invention is to provide a bristle construction which will allow a passage for the tooth paste throughout the length of the brush and which will project the edges of the bristles in sharp lines along the sides of the brush so that a more efficient cleansing action can be obtained.

Other objects and advantages reside in the detail construction of the invention, which is designed for simplicity, economy and efficiency. These will become more apparent from the following description.

In the following detailed description of the invention reference is had to the accompanying drawing which forms a part hereof. Like numerals refer to like parts in all views of the drawing and throughout the description.

Figure 1:
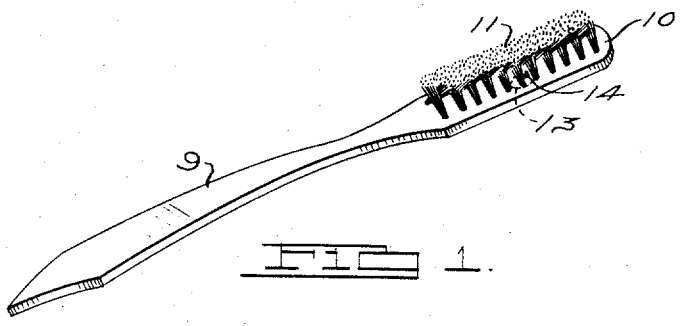
Fig. 1 is a perspective view of my improved tooth brush. The design and curvature of the handle, of course, forms no part of the present invention.
Figure 2:
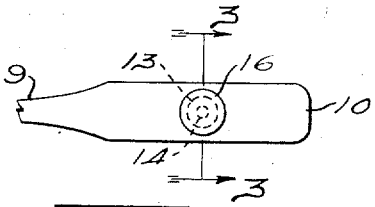
Fig. 2 is a back view of the brush.

My improved brush comprises a back or head 10 provided with a handle 9 and with bristles 11. It is desired to call attention to the peculiar placement of the bristles 11. The bristle tufts are set at an angle along the two sides of the back 10 so that the bristles will cross each other and leave an opening or passageway 12 along the front of the back 10. This construction projects the bristles toward the sides as well as toward the top of the brush so that an efficient cleansing surface is obtained over the entire bristle surface. It also projects the bristles along a sharp line at each side of the brush so that crevices in the teeth will be more easily reached.

Figure 3:
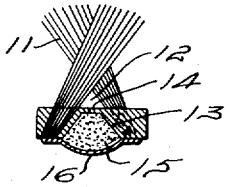
Fig. 3 is an enlarged cross section taken on the line 3—3, Fig. 2.

In the rear face of the back 10, a conical paste cavity 13 is formed which opens to the front of the back 10 through a paste discharge opening 14. In one form of my invention the cavity 13 is filled with tooth paste as indicated at 15, Fig. 3, the paste being covered by a label 16 of paper, rubber or similar material.

It can be readily seen that pressure on the label 16 by means of the finger will cause the paste to exude through the opening 14 into the bristle tuffs 11. This paste can travel throughout the length of the brush through the passageway 12 so as to reach all portions thereof.

This form of the brush is designed for cheap and rapid manufacture, preferably to be used but once and then discarded. The handle and brush back 10 can be formed of wood or similar inexpensive material. For a more elaborate and permanent construction the handle 9 and back 10 can be formed of bone, ivory, pyrolin, or similar substances, carrying the conical cavity 13.

Figure 4:
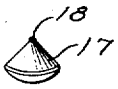
Fig. 4 is a detail view of a tooth paste container arranged for insertion in the back of the brush.

In the preferred form, the tooth paste is furnished in capsules 17, such as indicated in Fig. 4, which can be inserted into the conical cavity and which, when pressed by the finger, will force the paste into the passageway 12 between the bristles. The capsules 17 may be formed of leadfoil, glue paper, or similar material and are provided with either an opening 18 at their apex or with a relatively thin portion here which will open under pressure. The side walls of the cavity 13 prevent the capsule from breaking at any other point than opposite the discharge opening 14. The capsule can, if desired, be held in position in the brush by means of a label similar to the label in Fig. 3, or can simply be forced into place so as to remain by frictional engagement.

In either construction where a capsule or tooth paste is deposited in the cavity, it is apparent that the latter is partially defined at least, by a movable or a deformable wall covering the paste or capsule, which upon the application of pressure thereto, causes tooth paste to be extruded into the region of the bristles.

Figure 6:
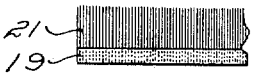
Fig. 6 is a detail view illustrating a strip of bristles to be used in the alternate form of Fig. 5.

In the alternate form of the invention the bristles are formed in continuous rows or strips 21 as illustrated in Fig. 6 banded together by means of a band 19 of suitable binding material. The binding material can be applied by dipping one edge of a row of bristles in a wax or glue solution which, in setting, will bind the entire row in a continuous ribbon.

The bristles might be bound by impressing them into a strip of glue or wax or sewn together between tapes, if desired. Any of these methods would form the band 19 to hold a continuous strip of bristles 21 together.

In placing the strips of bristles in the brush handle slots 20 are sawed into a brush back 24. The strips 21 are then forced into the slots 20 with the binding band concealed within the brush back 24. This construction forms a continuous wall of bristles on each side of the paste opening 14, so that the paste cannot escape at the sides of the brush.

Figure 7:
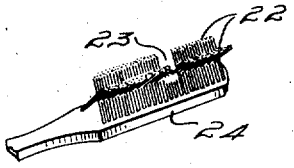
Fig. 7 illustrates a second alternate form of the invention.

In Fig. 7 I have illustrated a second alternate form of the invention in which the continuous rows 22 of bristles, of Fig. 6, have been incorporated. In this form, however, the continuous rows 22 are crossed similar to Fig. 1, to provide a channel to allow the paste to flow to the extremities of the row. The bristles are cut away as shown at 23, immediately over the paste chamber 13 so as to allow the paste to reach the extremities of the bristles.

Figure 5:
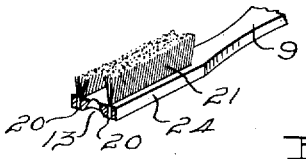
Fig. 5 is a detail perspective view illustrating an alternate form of the invention.

It is desired to be understood that any of the features of the various forms can be combined in any desired combination. For instance, the cut-away portion 23 of Fig. 7 can be applied to the brush of Fig. 1, or the construction of Fig. 1 can be applied to the form of Fig. 5 without crossing the bristles.

While a specific form of the improvement has been described and illustrated herein, it is desired to be understood that the same may be varied, within the scope of the appended claims, without departing from the spirit of the invention.

I claim:

1. A tooth brush comprising a brush back; two parallel rows of bristles arranged longitudinally of said back, the bristles in the opposite rows being placed at an angle so as to cross each other; the back of said brush being provided with a paste cavity opening to the face thereof under said crossing bristles; and a flexible strip covering said paste cavity.

2. A tooth brush comprising a brush back, bristles projecting from the forward face of said back; the rear face of said back being provided with a cavity, there being a passage from said cavity to the forward face of said back; and a paste-containing capsule adapted to fit within said cavity and discharge its contents through said passage.

3. A toothbrush comprising a head having bristles on one surface, a small quantity of tooth paste at one side of the head, means for allowing paste to be extruded to the bristles, and a deformable wall operatively connected to the head and housing the paste.

4. A toothbrush comprising a head having bristles on one surface, a small quantity of tooth paste on one side of the head, means for allowing the paste to be extruded to the bristles, and a deformable cover housing the paste and having a sealed connection at its edges to the head.

5. A toothbrush comprising an element having bristles on one surface, a capsule operatively connected to the element and containing a quantity of tooth paste substantially sufficient only for one teeth cleansing operation and means for allowing the paste to be extruded to the bristles.

6. A toothbrush comprising a head having bristles on one surface, a deformable wall on one side of the head and operatively connected thereto and at least partially defining a cavity of a size to receive a quantity of tooth paste sufficient for substantially only one teeth cleansing operation, tooth paste in such cavity and means for allowing the paste to be extruded to the bristles.

7. A toothbrush comprising a head having bristles on one surface, and a deformable wall at one side of the head and operatively connected thereto and at least partially defining a cavity of a size to receive a quantity of tooth paste substantially sufficient for only one teeth cleansing operation, tooth paste in said cavity, means for allowing the paste to be extruded to the bristles and a handle operatively connected to the head.

8. A toothbrush comprising an element having bristles on one surface, means sealing a small quantity of tooth paste substantially sufficient only for one teeth cleansing operation, means for operatively connecting the first means to the element so as to provide a unitary assembly of brush and tooth paste substantially sufficient for one teeth cleansing operation with the paste prior to use, maintained in a sealed condition, means for allowing the paste to be extruded to the bristles and a handle operatively connected to the head.

9. A tooth brush comprising an element having bristles on one surface, a small quantity of tooth paste at one side of the element, a deformable wall operatively connected to the element and housing the paste, and means normally sealing the paste so housed, but operable upon exerting pressure against the wall to allow the paste to be released.

10. A toothbrush comprising an element having bristles on one surface, a small quantity of tooth paste at one side of the element, a deformable wall operatively connected to the element and housing the paste, and releasable sealing means normally sealing the paste so housed from the bristles, whereby upon releasing said means and moving the wall, the paste may be released to the bristles.

11. A tooth brush comprising a handle, a head operatively connected to the handle and having a wall provided with bristles on one surface, means housing a small quantity of tooth paste at the opposite side from the bristles, and means for allowing the paste to be extruded from the housing means, and upon the bristles, said last mentioned means being free from the handle.

LYNUS O. GRAVES.